(12) United States Patent
Fainekos et al.

(10) Patent No.: US 11,586,914 B2
(45) Date of Patent: Feb. 21, 2023

(54) SYSTEMS AND METHODS FOR EVALUATING PERCEPTION SYSTEMS FOR AUTONOMOUS VEHICLES USING QUALITY TEMPORAL LOGIC

(71) Applicant: Arizona Board of Regents on Behalf of Arizona State University, Tempe, AZ (US)

(72) Inventors: Georgios Fainekos, Tempe, AZ (US); Hani Ben Amor, Tempe, AZ (US); Adel Dokhanchi, Tempe, AZ (US); Jyotirmoy Deshmukh, Torrance, CA (US)

(73) Assignees: Arizona Board of Regents on Behalf of Arizona State University, Tempe, AZ (US); University of Southern California, Los Angeles, CA (US)

( * ) Notice: Subject to any disclaimer, the term of this patent is extended or adjusted under 35 U.S.C. 154(b) by 443 days.

(21) Appl. No.: 16/741,328

(22) Filed: Jan. 13, 2020

(65) Prior Publication Data

US 2020/0226467 A1 Jul. 16, 2020

Related U.S. Application Data

(60) Provisional application No. 62/791,412, filed on Jan. 11, 2019.

(51) Int. Cl.
| | | |
|---|---|---|
| *G06N 3/00* | (2006.01) | |
| *G06N 3/08* | (2023.01) | |
| *G06T 7/77* | (2017.01) | |
| *G06N 3/04* | (2023.01) | |
| *G06F 16/245* | (2019.01) | |

(52) U.S. Cl.
CPC ............ *G06N 3/08* (2013.01); *G06F 16/245* (2019.01); *G06N 3/04* (2013.01); *G06T 7/77* (2017.01); *G06T 2207/20081* (2013.01); *G06T 2207/30261* (2013.01)

(58) Field of Classification Search
CPC ... G06N 3/08; G06T 7/77; G06T 2207/20081; G06T 2207/30261; G06F 16/245
See application file for complete search history.

(56) References Cited

U.S. PATENT DOCUMENTS

| | | | |
|---|---|---|---|
| 10,409,706 B2 | 9/2019 | Fainekos | |
| 10,766,489 B2 | 9/2020 | Tuncali et al. | |
| 2016/0292307 A1 | 10/2016 | Fainekos et al. | |
| 2017/0132479 A1* | 5/2017 | Krökel | G06V 20/56 |
| 2018/0232907 A1* | 8/2018 | Sung | H04N 17/002 |

(Continued)

FOREIGN PATENT DOCUMENTS

| | | | | |
|---|---|---|---|---|
| EP | 3531069 B1 * | 1/2021 | | G01C 21/005 |
| WO | 2015069869 A1 | 5/2015 | | |

OTHER PUBLICATIONS

Alur et al., A really temporal logic. J. ACM 41(1), 181-204 (1994).

(Continued)

*Primary Examiner* — Pakee Fang
(74) *Attorney, Agent, or Firm* — Polsinelli PC

(57) ABSTRACT

Various embodiments for systems and methods of evaluating perception systems for autonomous vehicles using a quality temporal logic are disclosed herein.

10 Claims, 3 Drawing Sheets
(2 of 3 Drawing Sheet(s) Filed in Color)

(56) References Cited

U.S. PATENT DOCUMENTS

2019/0101919 A1* 4/2019 Kobilarov ............ G05D 1/0274
2019/0220982 A1* 7/2019 Gottumukkal ... G08B 13/19602

OTHER PUBLICATIONS

Annapureddy et al., S-TaLIRo: A tool for temporal logic falsification for hybrid systems. In Tools and algorithms for the construction and analysis of systems. LNCS, vol. 6605. Springer (2011).

Bartocci et al., Specification-based monitoring of cyber-physical systems: A survey on theory, tools and applications. In Lectures on Runtime Verification—Introductory and Advanced Topics, LNCS, vol. 10457, pp. 128-168. Springer (2018).

Deshmukh et al., Quantifying conformance using the skorokhod metric. In Computer Aided Verification—27th International Conference, (CAV). pp. 234-250 (2015).

Dokhanchi et al., An efficient algorithm formonitoring practical TPTL specifications. In The ACM/IEEE International Conference on Formal Methods and Models for System Design, (MEMOCODE), pp. 184{193 (2016).

Dreossi et al., Systematic testing of convolutional neural networks for autonomous driving. In ICML Workshop on Reliable Machine Learning in the Wild (RMLW) (2017).

Fainekos et al., Robustness of temporal logic specifications for continuous-time signals. Theor. Comput. Sci. 410(42), 4262-4291 (2009).

Geiger et al., Vision meets robotics: The kitti dataset. International Journal of Robotics Research (IJRR) (2013).

Goodfellow et al., Deep Learning. MIT Press (2016), http://www.deeplearningbook.org.

IEEE Connected Vehicles: Google reports self-driving car disengagements, available at: http://sites.ieee.org/connected-vehicles/2015/12/15/google-reports-self-driving-car-disengagements.

Maler et al., Monitoring temporal properties of continuous signals. In Proceedings of FORMATS-FTRTFT. LNCS, vol. 3253, pp. 152-166 (2004).

Nguyen et al., Hyper properties of real-valued signals. In The ACM-IEEE International Conference on Formal Methods and Models for System Design, pp. 104-113. (MEMOCODE) (2017).

S-TaLiRo Toolbox, available at: https://sites.google.eom/a/asu.edu/s-taliro/s-taliro.

Tuncali et al., Simulation-based adversarial test generation for autonomous vehicles with machine learning components. In IEEE Intelligent Vehicles Symposium (IV) (2018).

Wu et al., Squeezedet: Unified, small, low powerfully convolutional neural networks for real-time object detection for autonomous driving (2016).

Xu et al., End-to-end learning of driving models from large-scale video datasets. In IEEE Conference on Computer Vision and Pattern Recognition (CVPR) (2017). https://doi.org/10.1109/CVPR.2017.376.

U.S. Appl. No. 16/994,967, filed Aug. 17, 2020, Fainekos et al.

* cited by examiner

SYSTEMS AND METHODS FOR EVALUATING PERCEPTION SYSTEMS FOR AUTONOMOUS VEHICLES USING QUALITY TEMPORAL LOGIC

CROSS-REFERENCE TO RELATED APPLICATIONS

This is a non-provisional application that claims benefit to U.S. provisional application Ser. No. 62/791,412 filed on Jan. 11, 2019, which is herein incorporated by reference in its entirety.

FIELD

The present disclosure generally relates to evaluating perception systems for autonomous vehicles; and in particular, to systems and methods for evaluating perception system for autonomous vehicles using quality temporal logic.

BACKGROUND

The wide availability of high-performance GPU-based hardware has led to an explosion in the applications of Machine Learning (ML) techniques to real-time image recognition problems, especially using deep learning. Such techniques are being used in safety-critical applications such as self-driving vehicles. Testing of these systems is largely based on either (a) measuring the recognition error on a pre-recorded data-set, or (b) running actual driving tests on the road with a backup human driver and focusing on the disengagements. Disengagement is an event when the autonomous car returns control back to the human driver. There is, thus, an urgent need for techniques to formally reason about the correctness and performance of such driving applications that use perception systems based on Deep Neural Networks (DNN) and ML algorithms.

The key challenge in formal verification is that it is infeasible to specify functional correctness of components using learning-based models in an abstract fashion. However, the confidence in the vision-based system can be vastly improved by extensive, safety-driven virtual testing of the vision algorithms.

It is with these observations in mind, among others, that various aspects of the present disclosure were conceived and developed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Corresponding reference characters indicate corresponding elements among the view of the drawings. The headings used in the figures do not limit the scope of the claims.

DETAILED DESCRIPTION

Figure 1:
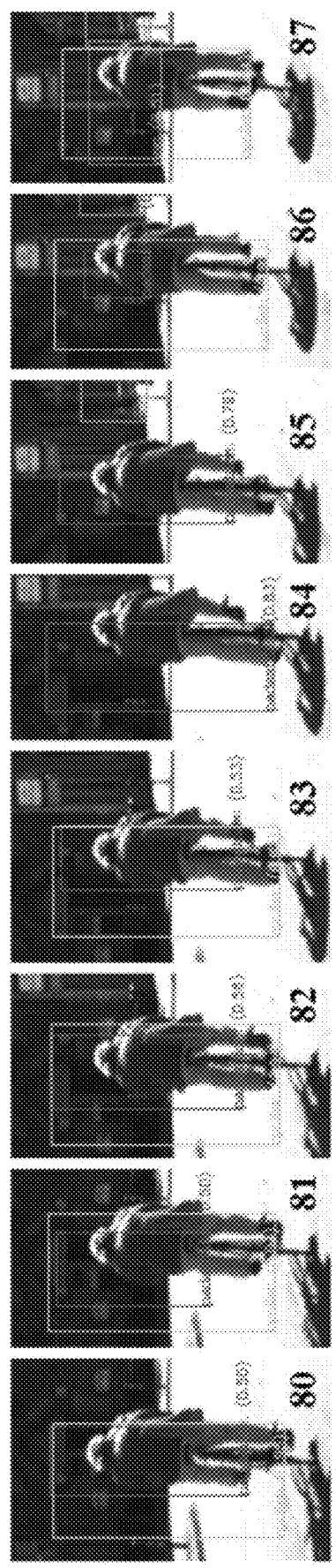
FIG. 1 shows various image frames of a cyclist resulting from the application of SqueezeDet on a KITTI data stream.

The present disclosure focuses on deep learning algorithms that analyze images or sequences of images in order to detect and classify objects for intention recognition and scenario classification. In order to evaluate the performance of the perception algorithms over time, quality requirements are required that capture temporal dependencies between detected objects. Most importantly, going beyond ad-hoc validation and testing, a formal framework is needed that facilitates temporal reasoning over the quality of the perception systems. Such a formal framework would enable the community to create a precise and real-life set of requirements that need to be met by any learning-based model.

In the present disclosure, temporal logic based quality requirements are considered for scoring or grading the results of perception algorithms. Then, a quality monitor considers the quality requirements to score the learning-based perception results. The present disclosure considers evaluating timed object data with respect to quality requirements presented in Timed Quality Temporal Logic (TQTL), which is based on Timed Propositional Temporal Logic (TPTL).

Problem Formulation

It is assumed that a data stream $\mathcal{D}$ is provided by a perception algorithm, LIDAR, RADAR, or other devices. An atomic block in a data stream is a frame which is a set $\{data_1, \ldots, data_m\}$, wherein each $data_j$ is an element of a data domain or data object. A stream $\mathcal{D}$ is a sequence of frames $\mathcal{D}(i)$ where i is the timestamp over a linearly ordered set. Each frame i contains data object $data_j \in \mathcal{D}(i)$ in a data-structure (a tuple) format, for example $data_j$=(ID, Class, Probability, BBOX (Bounding Box), . . . ). This data structure depends on the ML algorithm. The present method assumes that for each ML algorithm there exists a customized retrieve function $\mathcal{R}$ which can extract and access the information of the corresponding data object ($data_j$). In addition, there exists a customized attribute with quality metric which can be evaluated by a quality function to provide us the quality of the data objects in the stream.

In the case study, it is assumed that each data object of the ML algorithm has the following format $data_j$=(ID, Class, Probability, BBOX), where ID$\in \mathbb{N}$ is a number uniquely identifying an object, Probability $\in \mathbb{R} \cap [0, 1]$, Class$\in$ {Car, Cyclist, Pedestrian}, and BBOX is a tuple of four integers [top, left, bottom, right]$\in \mathbb{N}^4$ representing the coordinates of the bounding box in pixels. For example, a data stream for 3 different detected objects would look like:

Data Frame 0: $\mathcal{D}(0) = \{(1, "Car", 0.9, [283, 181, 413, 231])\}$

Data Frame 1: $\mathcal{D}(1) = \{(2, "Car", 0.8, [\ldots]), (1, "Car", 0.9, [\ldots])\}$ Data Frame 2: $\mathcal{D}(2) =$ $\{(3, "Car", 0.95, [\ldots]), (2, "Pedestrian", 0.9, [\ldots])\}$

⋮

It is also assumed that there exists a function $\mathcal{SO}$ (short for Set of Objects) which can retrieve the object IDs from a data frame $\mathcal{D}(i)$. For the above streaming data $\mathcal{D}$, the function SO returns the following values of object IDs: $\mathcal{SO}(\mathcal{D}(0))=\{1\}$, $\mathcal{SO}(\mathcal{D}(1))=\{1, 2\}$, $\mathcal{SO}(\mathcal{D}(2))=\{2, 3\}$. In order to retrieve the other fields (non-ID) from the data objects, it is assumed that these fields are available through the function $\mathcal{R}$. The present system uses object-oriented notation "." to retrieve the "XYZ" fields (attributes) from $\mathcal{D}(i)$ for object ID. So, $\mathcal{R}(\mathcal{D}(I), id) \cdot XYZ$ retrieves the "XYZ" attribute of object id from frame i. For the above vision stream example, $\mathcal{R}(\mathcal{D}(1), 2)\cdot\text{Class}=\text{Car}$, and $\mathcal{R}(\mathcal{D}(1), 2)$. Probability=0.8.

Without loss of generality, it is assumed that each data object in the stream $\mathcal{D}$ is provided by the ML algorithm with a unique object ID, wherein the specific object ID is unique over different frames of the video. In other words, it is assumed that the ML algorithm can match the objects of different frames and provide a unique ID of the object within the whole data stream. This is a necessary assumption to help us track these objects through frames and to apply temporal reasoning over the specific objects.

Given a finite stream $\mathcal{D}$ and Quality Temporal Logic formula $\varphi$, the goal of the present system is to compute the quality value of formula $\varphi$ with respect to stream $\mathcal{D}$. Throughout this disclosure, the notation $[\![\phi]\!]$ is used to represent the quality value of formula $\phi$. Finally, it is assumed that the quality can be quantified by a real-valued number similar to the robust semantics of temporal logics.

Timed Quality Temporal Logic

In this section, the important aspects of stream reasoning for object detection algorithms are considered. Also, the corresponding syntax and semantics will be provided to address the problem of quality reasoning. One important differentiating factor of quality monitoring to Signal Temporal Logic (STL) monitoring is that the number of objects in the video is dynamically changing. Therefore, the present method introduces Existential and Universal quantifiers to reason about the dynamically changing number of data objects. In addition, the present system needs to be able to record the time in order to extract the data objects using function $\mathcal{R}$ at different timestamps.

Timed Quality Temporal Logic (TQTL) is defined to reason about a stream $\mathcal{D}$. Assume that $\mathcal{P} = \{\pi_1, \pi_2, \ldots, \pi_n\}$ is a set of predicates which define assertions about data objects. Each $\pi_j$ corresponds to $\pi_j \equiv f(j_1, \ldots, j_n, id_1, \ldots, id_n) \sim c$, where $f(j_1, \ldots, j_n, id_1, \ldots, id_n)$ is a scoring function which extracts/processes information about data objects $id_1, \ldots, id_n$ from frames $j_1, \ldots, j_n$, and compares it with a constant c to resolve the quality of the data objects. It should be noted that c can be a string, integer, real, enumerator, or any constant data type that the ML algorithm uses to represent data. The symbols $\sim \in \{=, \geq, >, <, \leq\}$ are relational operators.

Definition 1 (TQTL Syntax). The set of TQTL formulas $\phi$ over a finite set of predicates $\mathcal{P}$, a finite set of time variables ($V_t$), and a finite set of object indexes ($V_o$) is inductively defined according to the following BNF grammar:

$\varphi ::= T|\pi|x\cdot\phi|\exists id@x,\phi|x\leq y+n|\neg\phi|\phi_1 \vee \phi_2|\phi_1 U \phi_2$ where $\pi \in \mathcal{P}$, T is true, $x, y \in V_t$, $n \in \mathbb{N}$, $id \in V_o$, U is the Until operator. The time constraints of TQTL are represented in the form of $x \leq y+n$. The freeze time quantifier $x\cdot\phi$ assigns the current time i to time variable x before processing the subformula $\phi$. The Existential quantifier is denoted as $\exists$. The Universal quantifier is defined as $\forall id@x,\phi \equiv \neg(\exists id@x,\neg\phi)$. For TQTL formulas $\psi$, $\varphi$, define $\psi \wedge \varphi \equiv \neg(\neg\psi \vee \neg\phi)$, $\bot \equiv \neg T$ (False), $\psi \rightarrow \phi \equiv \neg\psi \vee \phi$ ($\psi$ Implies $\phi$), $\diamond \psi \equiv TU\psi$ (Eventually $\psi$), $\square\psi \equiv \neg \diamond \neg\psi$ (Always $\psi$) using syntactic manipulation. The semantics of TQTL is defined over an evaluation function $\epsilon: V_t \cup V_o \rightarrow \mathbb{N}$ which is an environment for the time variables and object IDs.

Definition 2 (TQTL Semantics). Consider the data stream $\mathcal{D}$, $i \in \mathbb{N}$ is the index of current frame, $\pi \in \mathcal{P}$, $\phi$, $\phi_1$, $\phi_2 \in$ TQTL and evaluation function $\epsilon: V_t \cup V_o \rightarrow \mathbb{N}$. The quality value of formula $\phi$ with respect to $\mathcal{D}$ at frame i with evaluation $\epsilon$ is recursively assigned as follows:

$[\![T]\!](\mathcal{D}, i, \epsilon) := +\infty$ $[\![\pi]\!](\mathcal{D}, i, \epsilon) := [\![f_\pi(j_1, \ldots, j_n, id_1, \ldots, id_n) \sim c]\!](\mathcal{D}, i, \epsilon)$ $[\![x\cdot\phi]\!](\mathcal{D}, i, \epsilon) := [\![\phi]\!](\mathcal{D}, i, \epsilon[x \Leftarrow i])$ $[\![\exists id@x, \phi]\!](\mathcal{D}, i, \epsilon) := \max_{k \in SO(\mathcal{D}(\epsilon(x)))} ([\![\phi]\!](\mathcal{D}, i, \epsilon[id \Leftarrow k]))$ $[\![x \leq y+n]\!](\mathcal{D}, i, \epsilon) := \begin{cases} +\infty & \text{if } \epsilon(x) \leq \epsilon(y)+n \\ -\infty & \text{otherwise} \end{cases}$ $[\![\neg\phi]\!](\mathcal{D}, i, \epsilon) := -[\![\phi]\!](\mathcal{D}, i, \epsilon)$ $[\![\phi_1 \vee \phi_2]\!](\mathcal{D}, i, \epsilon) := \max([\![\phi_1]\!](\mathcal{D}, i, \epsilon), [\![\phi_2]\!](\mathcal{D}, i, \epsilon))$ $[\![\phi_1 U \phi_2]\!](\mathcal{D}, i, \epsilon) := \max_{i \leq j}\left(\min\left([\![\phi_2]\!](\mathcal{D}, j, \epsilon), \min_{i \leq k \leq j}[\![\phi_1]\!](\mathcal{D}, k, \epsilon)\right)\right)$ Here, $\epsilon[x \Leftarrow a]$ assigns the value a into the variable $x \in V$ in the environment $\epsilon$. Given a variable $\epsilon \in V$ and a value $q \in \mathbb{N}$, the environment $\epsilon' = \epsilon[x \Leftarrow q]$ is designed to be equivalent to the environment $\epsilon$ on all variables in V except variable x which now has value q. It is said that $\mathcal{D}$ satisfies $\varphi(\mathcal{D} \models \varphi)$ iff $[\![\phi]\!](\mathcal{D}, 0, \epsilon_0) > 0$, where $\epsilon_0$ is the initial environment. On the other hand, a data stream $\mathcal{D}'$ does not satisfy a TQTL formula $\phi$ (denoted by $\mathcal{D}' \not\models \phi$), iff $[\![\phi]\!](\mathcal{D}, 0, \epsilon_0) \leq 0$. The quantifier $\exists id@x$ is the maximum operation on the quality values of formula $[\![\phi]\!]$ corresponding to the objects IDs=$\epsilon$ (id) that are detected at frame $\epsilon(x)$.

It is assumed that for each ML algorithm there exists a corresponding retrieve function $\mathcal{R}$ to extract the values corresponding to data objects. The set of predicates $\mathcal{P} = \{\pi_1, \pi_2, \ldots, \pi_n\}$ evaluate object data values and return a quality value in $\mathbb{R} \cup \{\pm\infty\}$. Each quality predicate $\pi$ has an associated scoring function $f_\pi$. The scoring function $f_\pi(j_1, \ldots, j_n, id_1, \ldots, id_n)$ extracts specific information about object $id_k$ at frame $j_k$ for each $k \in \{1, \ldots, n\}$ and compares it with c to compute the quality value of the predicate $\pi$ represented as $[\![f_\pi(j_1, \ldots, j_n, id_1, \ldots, id_n) \sim c]\!] \in \mathbb{R} \cup \{\pm\infty\}$ similar to robustness semantics. The scoring functions of the quality predicates depend on the ML algorithm, $\mathcal{R}$, data fields of $\mathcal{D}$, operator $\sim$, and type of c. Each scoring function $f_\pi$ uses the application dependent customized function $h_\pi$ to compute the quality of the corresponding objects. The function $h_\pi$ then returns a value about the quality of the data objects which will be used by $f_\pi$ to compute the quality value of the predicate $\pi$ which is denoted as $[\![\pi]\!]$.

In general, $[\![f_\pi(j_1, \ldots, j_n, id_1, \ldots, id_n) \sim c]\!]$ may be of two types. The first returns a Boolean result of comparing values from sets without scalar metrics, i.e., comparing the object class of pedestrian with respect to {car, cyclist}. For example, in this case, for equality =, it can be defined as:

$[\![f_e(j_1, \ldots, j_n, id_1, \ldots, id_n) = c]\!](\mathcal{D}, i, \epsilon) :=$ $\begin{cases} +\infty & \text{if } h_e([\mathcal{R}(\mathcal{D}(\epsilon(j_k)), \epsilon(id_k))]_{k=1}^n) = c \wedge \forall k \in \{1, \ldots, n\}, \\ & \epsilon(id_k) \in SO(\mathcal{D}(\epsilon(j_k))) \\ -\infty & \text{otherwise} \end{cases}$ The second type is for predicates comparing values from sets with well-defined metrics similar to the various temporal logic robust semantics. For example, for "greater than", the present system could define:

$$[\![f_n(j_1, \ldots, j_n, id_1, \ldots, id_n) > c]\!](\mathcal{D}, i, \epsilon) :=$$

$$\begin{cases} h_n([\mathcal{R}(\mathcal{D}(\epsilon(j_k)), \epsilon(id_k))]_{k=1}^n) - c & \text{if } \forall k \in \{1, \ldots, n\}, \\ & \epsilon(id_k) \in SO(\mathcal{D}(\epsilon(j_k))) \\ -\infty & \text{otherwise} \end{cases}$$

wherein k is index of the kth object variable ($id_k$) and $j_k$ is the kth time variable of the formula. Here, $h_e$ and $h_n$ are application dependent functions on the data fields of $\mathcal{D}$, which process the retrieved values of data objects $\epsilon(id_k)$ at $\epsilon(j_k)$ if $\epsilon(id_k) \in SO(\mathcal{D}(\epsilon(j_k)))$. The second predicate type can return finite real values.

TQTL Example: Referring to FIG. 1. When a car is following a cyclist, it is important that the cyclist is correctly classified in order to utilize the appropriate predictive motion model. The present system considers the following vision quality requirement: "At every time step, for all the objects ($id_1$) in the frame, if the object class is cyclist with probability more than 0.7, then in the next 5 frames the object $id_1$ should still be classified as a cyclist with probability more than 0.6'. The requirement can be formalized in TQTL as follows:

$$\phi_1 = \Box \begin{pmatrix} x \cdot \forall id_1 @ x, (C(x, id_1) = \text{Cyclist} \land P(x, id_1) > 0.7) \rightarrow \\ \Box(y \cdot ((x \leq y \land y \leq x + 5) \rightarrow C(y, id_1) = \text{Cyclist} \land P(y, id_1) > 0.6)) \end{pmatrix}$$

where $$[\![C(x, id_1) = \text{Cyclist}]\!](\mathcal{D}, i, \epsilon) :=$$

$$\begin{cases} +\infty & \epsilon(id_1) \in SO(\mathcal{D}(\epsilon(x))) \text{ and } \mathcal{R}(\mathcal{D}(\epsilon(x)), \epsilon(id_1)) \cdot \text{Class} = \text{Cyclist} \\ -\infty & \epsilon(id_1) \notin SO(\mathcal{D}(\epsilon(x))) \text{ or} \\ & \epsilon(id_1) \in SO(\mathcal{D}(\epsilon(x))) \text{ and } \mathcal{R}(\mathcal{D}(\epsilon(x)), \epsilon(id_1)) \cdot \text{Class} \neq \text{Cyclist} \end{cases}$$

Experimental Results

The implementation of a TQTL monitor of the present system is based on the publicly available S-TaLiRo toolbox. The TQTL monitor was evaluated using the KITTI benchmark dataset. The KITTI dataset is a well-known benchmark for autonomous driving which contains real traffic situations from Karlsruhe, Germany. A processor ran the SqueezeDet object detection algorithm on some KITTI data streams. It should be noted that the object matching is manually annotated in these data streams since it is assumed that the objects are matched correctly. However, automated reliability reasoning about object matching throughout video streams is a challenging problem and it is the focus of on-going research.

In FIG. 1, the results of SqueezeDet on a KITTI data stream (following a cyclist) are provided. The TQTL formula $\phi_1$ from the previous section with respect to $\mathcal{D}$ was evaluated. The monitor tool obtained a negative result when evaluating $[\![\phi_1]\!]$, i.e., $\mathcal{D} \models \phi_1$. This was because the data stream D does not contain an object classified as cyclist in Frames 84 and 85 in FIG. 1. A closer investigation of Frames 84 and 85 shows that, although a cyclist is not detected (yellow box), a pedestrian is detected at the position of the cyclist with purple color. If the motion prediction algorithm had the capability to tolerate an object classification change, e.g., from cyclist to pedestrian and back, then the formal specification should be able to reflect that. To specify such a behavior, the second $\Box$ of $\phi_1$ should be changed to:

$$\Box(y \cdot ((x \leq y \land y \leq x+5) \rightarrow C(y, id_1) = \text{Cyclist} \land P(y, id_1) > 0.6$$

$$\lor \exists id_2 @ y, (C(y, id_2) = \text{Pedestrian} \land \text{dist}(x, y, id_1, id_2) < 40 \land P(y, id_2) > 0.6)))$$

where the scoring function of dist extracts the coordinates of the bounding boxes of object $id_1$ at frame x and object $id_2$ at frame y for computing the center to center distance between these boxes. The requirement is now satisfied by $\mathcal{D}$.

Persephone

Figure 2:
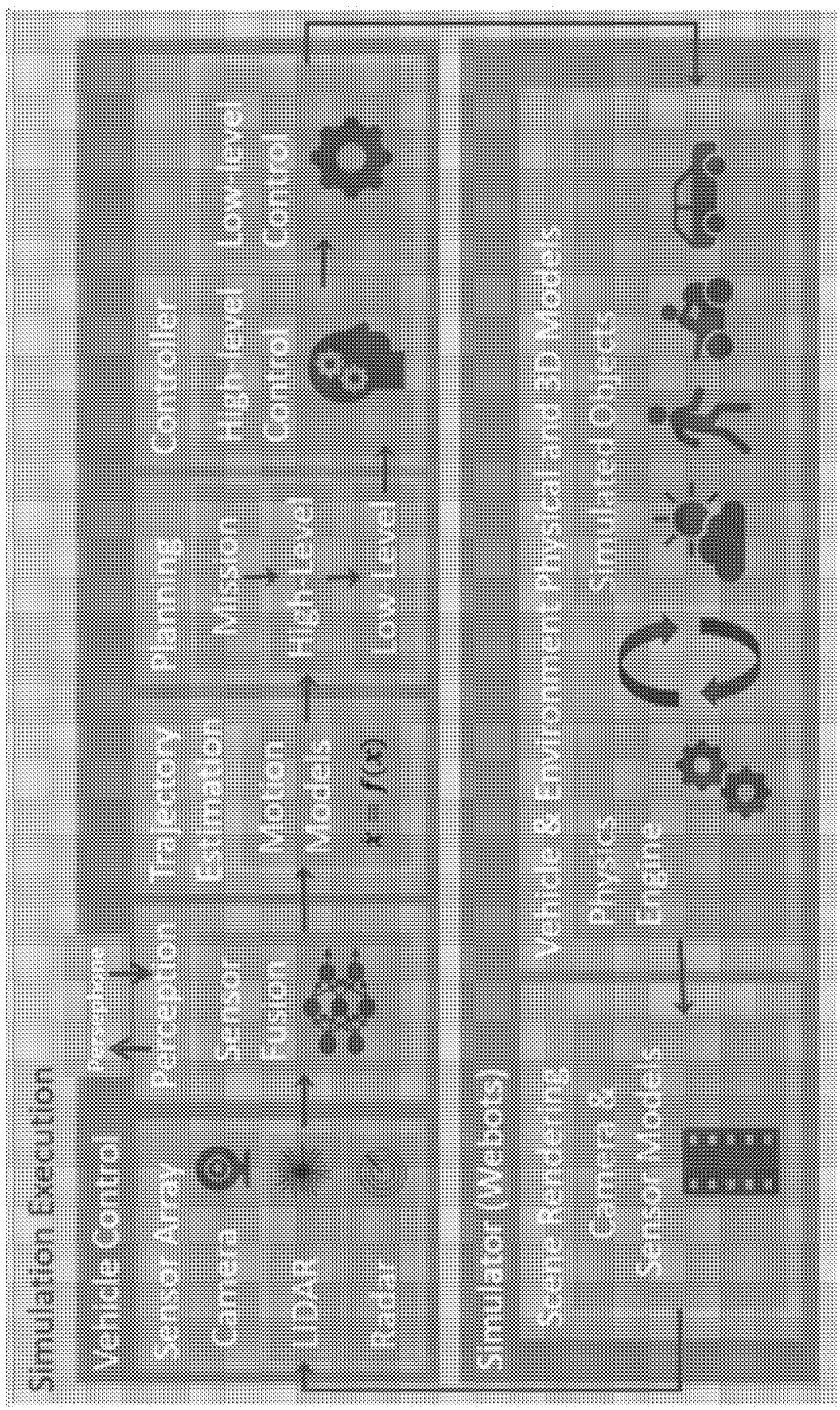
FIG. 2 shows an implementation of one embodiment of the present system within an autonomous vehicle testing framework.

One embodiment of this framework, referred to herein as "Persephone", is implemented within a larger autonomous driving testing system called Sim-ATAV. FIG. 2 refers to a "simulation execution" block in which Persephone implements the TQTL monitoring logic in MATLAB. This embodiment of the framework continually verifies the validity of the Sim-ATAV perception module. Sim-ATAV is available as an open-source project at this link: https://sites.google.com/a/asu.edu/s-taliro/sim-atav. Persephone is available as an open-source project at this link: https://bitbucket.org/cps_vida/persephone/src/master/.

Computing System

Figure 3:
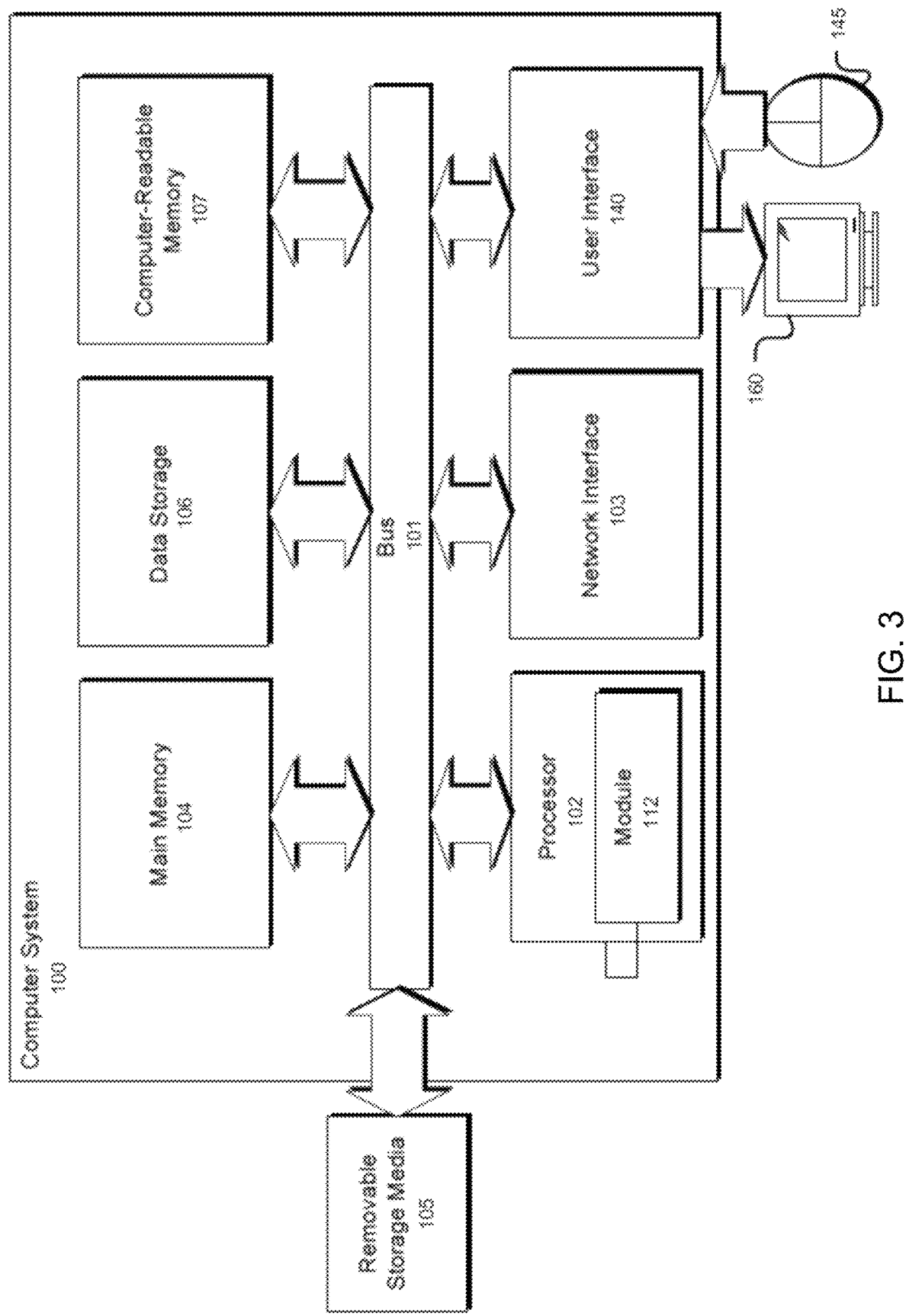
FIG. 3 is a simplified block diagram showing an exemplary computing system for effectuating the system and method for evaluating perception systems for autonomous vehicles.

An example of a suitable computing system 100 used to implement various aspects of the present system and methods for evaluating perception systems for autonomous vehicles using quality temporal logic are discussed below and shown in FIG. 3. Example embodiments described herein may be implemented at least in part in electronic circuitry; in computer hardware executing firmware and/or software instructions; and/or in combinations thereof. Example embodiments also may be implemented using a computer program product (e.g., a computer program tangibly or non-transitorily embodied in a machine-readable medium and including instructions for execution by, or to control the operation of, a data processing apparatus, such as, for example, one or more programmable processors or computers). A computer program may be written in any form of programming language, including compiled or interpreted languages, and may be deployed in any form, including as a stand-alone program or as a subroutine or other unit suitable for use in a computing environment. Also, a computer program can be deployed to be executed on one computer, or to be executed on multiple computers at one site or distributed across multiple sites and interconnected by a communication network.

Certain embodiments are described herein as including one or more modules 112. Such modules 112 are hardware-implemented, and thus include at least one tangible unit capable of performing certain operations and may be configured or arranged in a certain manner. For example, a hardware-implemented module 112 may comprise dedicated circuitry that is permanently configured (e.g., as a special-purpose processor, such as a field-programmable gate array (FPGA) or an application-specific integrated circuit (ASIC)) to perform certain operations. A hardware-implemented module 112 may also comprise programmable circuitry (e.g., as encompassed within a general-purpose processor or other programmable processor) that is temporarily configured by software or firmware to perform certain operations. In some example embodiments, one or more computer systems (e.g., a standalone system, a client and/or server computer system, or a peer-to-peer computer system) or one or more processors may be configured by software (e.g., an application or application portion) as a hardware-implemented module 112 that operates to perform certain operations as described herein.

Accordingly, the term "hardware-implemented module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules 112 are temporarily configured (e.g., programmed), each of the hardware-implemented modules 112 need not be configured or instantiated at any one instance in time. For example, where the hardware-implemented modules 112 comprise a general-purpose processor configured using software, the general-purpose processor may be configured as respective different hardware-implemented modules 112 at different times. Software may accordingly configure a processor 102, for example, to constitute a particular hardware-implemented module at one instance of time and to constitute a different hardware-implemented module 112 at a different instance of time.

Hardware-implemented modules 112 may provide information to, and/or receive information from, other hardware-implemented modules 112. Accordingly, the described hardware-implemented modules 112 may be regarded as being communicatively coupled. Where multiple of such hardware-implemented modules 112 exist contemporaneously, communications may be achieved through signal transmission (e.g., over appropriate circuits and buses) that connect the hardware-implemented modules. In embodiments in which multiple hardware-implemented modules 112 are configured or instantiated at different times, communications between such hardware-implemented modules may be achieved, for example, through the storage and retrieval of information in memory structures to which the multiple hardware-implemented modules 112 have access. For example, one hardware-implemented module 112 may perform an operation, and may store the output of that operation in a memory device to which it is communicatively coupled. A further hardware-implemented module 112 may then, at a later time, access the memory device to retrieve and process the stored output. Hardware-implemented modules 112 may also initiate communications with input or output devices.

As illustrated, the computing system 100 may be a general purpose computing device, although it is contemplated that the computing system 100 may include other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the general purpose computing device may include various hardware components, such as a processor 102, a main memory 104 (e.g., a system memory), and a system bus 101 that couples various system components of the general purpose computing device to the processor 102. The system bus 101 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing system 100 may further include a variety of computer-readable media 107 that includes removable/non-removable media and volatile/nonvolatile media, but excludes transitory propagated signals. Computer-readable media 107 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the general purpose computing device. Communication media includes computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The main memory 104 includes computer storage media in the form of volatile/nonvolatile memory such as read only memory (ROM) and random access memory (RAM). A basic input/output system (BIOS), containing the basic routines that help to transfer information between elements within the general purpose computing device (e.g., during start-up) is typically stored in ROM. RAM typically contains data and/or program modules that are immediately accessible to and/or presently being operated on by processor 102. For example, in one embodiment, data storage 106 holds an operating system, application programs, and other program modules and program data.

Data storage 106 may also include other removable/non-removable, volatile/nonvolatile computer storage media. For example, data storage 106 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media provide storage of computer-readable instructions, data structures, program modules and other data for the general purpose computing device 100.

A user may enter commands and information through a user interface 140 or other input devices 145 such as a tablet, electronic digitizer, a microphone, keyboard, and/or pointing device, commonly referred to as mouse, trackball or touch pad. Other input devices 145 may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices 145 are often connected to the processor 102 through a user interface 140 that is coupled to the system bus 101, but may be connected by other interface and bus structures, such as a parallel port, game port or a universal serial bus (USB). A monitor 160 or other type of display device is also connected to the system bus 101 via user interface 140, such as a video interface. The monitor 160 may also be integrated with a touch-screen panel or the like.

The general purpose computing device may operate in a networked or cloud-computing environment using logical connections of a network interface 103 to one or more remote devices, such as a remote computer. The remote computer may be a personal computer, a server, a router, a network PC, a peer device or other common network node, and typically includes many or all of the elements described above relative to the general purpose computing device. The logical connection may include one or more local area networks (LAN) and one or more wide area networks (WAN), but may also include other networks. Such networking environments are commonplace in offices, enterprise-wide computer networks, intranets and the Internet.

When used in a networked or cloud-computing environment, the general purpose computing device may be connected to a public and/or private network through the network interface 103. In such embodiments, a modem or other means for establishing communications over the network is connected to the system bus 101 via the network interface 103 or other appropriate mechanism. A wireless networking component including an interface and antenna may be coupled through a suitable device such as an access point or peer computer to a network. In a networked environment, program modules depicted relative to the general purpose computing device, or portions thereof, may be stored in the remote memory storage device.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A framework for evaluating the quality of a vehicle perception system, the framework comprising:
a processor operable for executing instructions comprising:
extracting an object index and a set of data attributes from a frame of an object detection data stream, wherein the object index and the set of data attributes are associated with an object detected by a vehicle perception system;
receiving a set of quality predicates descriptive of expected behavior of the vehicle perception system over a plurality of frames, wherein each of the set of quality predicates is associated with a frame, wherein each of the set of quality predicates is associated with a scoring function of a plurality of scoring functions and wherein the set of quality predicates descriptive of expected behavior of the vehicle perception system over the plurality of frames are defined in terms of a Timed Quality Temporal Logic syntax;
evaluating each of the plurality of scoring functions based on observed behavior of the vehicle perception system over the plurality of frames, wherein each of the plurality of scoring functions extracts information associated with the object using the set of data attributes and compares the information with a constant quality value and wherein a result of the scoring function is descriptive of observed behavior of the vehicle perception system with respect to the associated quality predicate; and
identifying one or more quality predicates of the plurality of quality predicates that the vehicle perception system does not satisfy based on the evaluation of the plurality of scoring functions indicative of observed behavior of the vehicle perception system with respect to expected behavior of the vehicle perception system over the plurality of frames.

2. The framework of claim 1, wherein each of the plurality of scoring functions comprises an application-specific quality function, wherein the application-specific quality function returns a quality value about the set of data attributes indicative of observed behavior of the vehicle perception system over the plurality of frames with respect to expected behavior of the vehicle perception system over the plurality of frames as defined by the associated quality predicate.

3. The framework of claim 2, wherein the quality value returned from the application-specific quality function is used by the scoring function to determine the quality value associated with the quality predicate of the set of quality predicates, wherein the quality value is indicative of how the observed behavior of the vehicle perception system adheres to expected behavior of the vehicle perception system over the plurality of frames.

4. The framework of claim 1, wherein the object detection data stream is provided by a perception algorithm of the vehicle perception system.

5. The framework of claim 4, wherein a set-of-objects function is operable to retrieve the object index from a frame of the object detection stream and wherein the set-of-objects function is specific to the perception algorithm.

6. The framework of claim 4, wherein a retrieval function retrieves the set of data attributes from a frame of the object detection stream and wherein the retrieval function is specific to the perception algorithm.

7. The framework of claim 4, wherein the object detection stream is a tuple comprised of a plurality of data types.

8. The framework of claim 7, wherein the tuple comprises an object index and a plurality of data attributes, wherein the plurality of data attributes comprises a probability associated with the object, a class associated with the object, and a set of bounding box coordinates associated with the object.

9. The framework of claim 2, wherein the application-specific quality function may be defined by a user for a particular application.

10. The framework of claim 1, wherein the scoring function returns a Boolean result when comparing data attributes from sets without scalar metrics.

* * * * *